United States Patent [19]
Walters

[11] Patent Number: 4,586,599
[45] Date of Patent: May 6, 1986

[54] METHOD AND APPARATUS FOR PREVENTING AIR POLLUTION BY THE ENTRAINMENT OF PARTICULATE MATERIAL

[76] Inventor: Wally Z. Walters, c/o Preco Corporation, Front St., West Springfield, Mass. 01089

[21] Appl. No.: 543,774

[22] Filed: Oct. 20, 1983

[51] Int. Cl.$^4$ .................. B65G 21/00; B65G 47/38
[52] U.S. Cl. .................. 198/364; 119/52 B; 198/860.3
[58] Field of Search .......... 198/861, 508, 364; 414/133, 291; 119/52 B

[56] References Cited

U.S. PATENT DOCUMENTS

| | | | |
|---|---|---|---|
| 791,175 | 5/1905 | Baldwin et al. | 198/585 |
| 3,707,998 | 1/1973 | Dalrymple | 414/291 |
| 4,061,221 | 12/1977 | Higashinaka et al. | 414/291 |
| 4,358,011 | 11/1982 | Buschbom et al. | 198/861 |
| 4,420,285 | 12/1983 | Loyer et al. | 414/291 |

FOREIGN PATENT DOCUMENTS

| | | | |
|---|---|---|---|
| 524558 | 5/1950 | Canada | 198/861 |
| 56-136711 | 10/1981 | Japan | 414/291 |

*Primary Examiner*—Joseph E. Valenza
*Assistant Examiner*—Daniel R. Alexander
*Attorney, Agent, or Firm*—Hughes & Cassidy

[57] ABSTRACT

Methods of and systems for preventing air pollution in the handling and storing of particulate solids out-of-doors in bulk form; i.e., in a pile. A windfoil arrangement keeps material from being entrained in wind blowing over the pile and thereby causing an air pollution problem. The problem is particularly acute when material is being dumped; it also arises when wind strips the particulate material from the pile, and it can result in the particulate material being scattered over a widespread area (typically one mile or more in radius) which indicates that the air pollution is not restricted to the immediate vicinity of the area in which the material is stored.

11 Claims, 5 Drawing Figures

METHOD AND APPARATUS FOR PREVENTING AIR POLLUTION BY THE ENTRAINMENT OF PARTICULATE MATERIAL

TECHNICAL FIELD OF THE INVENTION

The present invention relates to the outdoor bulk storage of particulate materials and to a novel, improved method for preventing wind from creating air pollution by entraining the smaller particles of a non-homogeneous material as the latter is dumped and, secondarily, by stripping smaller particles from a pile of the particulate material.

BACKGROUND OF THE INVENTION

Many materials are stored out-of-doors in bulk form; i.e., in large piles. These include sawdust, coal, grain, mine tailings, various ores and minerals, sand and gravel, wood chips, bark, and a host of other materials having fractions that, because of their size-weight relationship, easily become airborne.

Pollution of the ambient environment is a major problem in the out-of-doors storage of such particulate materials. Even relatively mild winds can pick up and entrain the material as it is being dumped to add onto or to form a pile and can dislodge and scatter material from the pile.

Scattering of particulate solids to any considerable extent from materials piled out-of-doors is at present time considered an environmental threat, and Federal as well as local jurisdictions have enacted legislation limiting the extent to which the entrainment in air of even benign particulates is permitted.

Numerous solutions to the problem have been employed and proposed. Those with which I am particularly familiar deal with the handling and storage of sawdust, and this disclosure will accordingly hereinafter be developed primarily with reference to that material. It is to be understood, however, that this is being done primarily for the sake of conciseness and convenience and is not intended to limit the scope of my invention as defined in the appended claims.

Schemes for preventing the scattering of sawdust and other particulate materials which include significant amounts of fines include enclosure of the pile. This is economically impractical. A typical sawdust pile as located at a pulp mill, for example, will be fifty feet high, seventy-five feet wide at the base, and three-four hundred feet long. An enclosure capable of housing such a pile would cost two-four million dollars at the present time.

Furthermore, in the instances in which this approach has been adopted, it has been found that the particulate material hangs up on the walls and other structural components of traditionally designed enclosures, and bridges between such components, making it difficult, and therefore costly, to remove the material as it is needed. Expensive redesign and re-engineering of conventional structures would be required to solve this problem.

Yet another disadvantage of enclosing a pile of particulate material is that the circulation of air around the pile of particulate material and the radiation of heat from the pile are severely restricted, and cooling of the pile via these two important heat transfer mechanisms is consequently reduced to a significant extent. Therefore, spontaneous combustion becomes a serious problem. This is handled by spraying the pile of particulate matter with water. Spraying is expensive in itself and because the material removed from the pile may later have to be dried as when it is to be used as a fuel, for example.

Another, equally impractical, heretofore proposed solution to the scattering problem has been to at least partially bury the pile of particulate material; i.e., to put the pile in a pit. This, too, is costly. Furthermore, in at least one instance of which I am aware, the solution was not effective; air pollution still exceeded statutory limits, primarily because burial does not solve the important problem of preventing entrainment of fines while the particulate material is being dumped.

In addition, ground water, accumulation of rain, and spontaneous combustion due to the restriction of air circulation and reduced dissipation of heat by radiation make the burial solution impractical.

Fencing akin to that employed to keep snow from drifting has also been proposed. Again, the solution is impractical. As far as I am aware, no one has as yet discovered how to build a fifty foot high snow fence at an acceptable cost, primarily because of the huge wind loads such a fence would have to be designed to withstand. To enclose a pile of particulate material of the size discussed above, for example, would exceed one million dollars.

Covering the sides of a pile of particulate material with netting has also been proposed. Again, the solution is impractical. Large particles hang up in, and plug, the interstices of the netting. The result is that the netting in effect becomes a huge sail. Materials and holddowns capable of handling the resulting wind loads would be prohibitively expensive.

Baffles equaling the height of the pile of particulate material and located on its windward side have also been proposed. This solution is not feasible. Shifts in wind direction must be taken into account, compounding the magnitude of this approach and making it cost prohibitive.

Because the problem is most acute when material is being dumped onto the pile, other solutions directed specifically to this aspect were also investigated.

The particulate solids are typically dumped onto the pile from an overhead conveyor; and flexible cloth sleeves have been employed to keep the material from becoming airborne as it is dumped. This limited solution proved impractical as the sleeves became imbedded in the particulate material. As a consequence, they could not be withdrawn from the pile and were ripped off as sawdust was extracted from the bottom of the pile.

Rigid chutes were also proposed, but this idea was almost immediately discarded. To be useful, the chute has to be capable of being moved from end-to-end of the pile; also, to prevent air entrainment of fines while material is being dumped on the pile, the chute would have to be capable of being extended where the pile is low and of being retracted where it is high. Such chutes would be difficult to design so that they would not physically interfere with the system provided to dump the particulate material; they would also be costly, if not impractical, to construct in a typical application where variations in the height of the pile might be on the order of fifty feet.

BRIEF DESCRIPTION OF THE INVENTION

I have now discovered a solution to the problem of particulate solids scattering which is extremely simple, and, at the same time, highly effective and inexpensive.

In brief, my solution is to so divert wind over the top of the pile being protected as to form eddy currents on the leeward side of the pile. Any material entrained in the air currents drops out of them in this region and is deposited on the pile's leeward side.

As suggested above, an elevated or overhead conveyor is employed to dump the particulate material being handled and form or add to the pile in a typical application. Diversion of the air currents and the formation of the eddies as just discussed can, in such circumstances, be accomplished by disposing a vertically oriented windfoil between the conveyor and the top of the pile with its lower edge being proximate to, in contact with, or buried in the pile. Typically, the last-mentioned approach will be adopted so that wind loads can be taken up by the material in the pile, reducing the need for strength in and, consequently, the cost of fabricating and supporting the windfoil. Additional reductions in the load which the windfoil and its supporting structure must withstand can be obtained by pivotally supporting the windfoil from the overhead conveyor and by perforating it.

The particulate material may cling to the windfoil and impose relatively large, downwardly acting forces upon it. To minimize these forces, a windfoil with smooth surfaces will preferably be employed. And, to ensure that loads upon the windfoil are not transmitted to the supporting structure to an extent apt to damage the latter, shear pins or the like are preferably employed between the windfoil and its supporting structure.

The windfoil extends in the same direction as the pile of particulate material it is employed to protect. It may span the entire length of the pile or only part of it. In the latter case material will be dumped upon the unprotected part of the pile only on calm days; and the windfoil is relied upon to prevent scattering of the material under less settled atmospheric conditions, the particulate material then being dumped only on that part of the pile protected by the windfoil.

I also preferably install at one (or both) ends of the pile a vertically oriented windfoil extending transversely across the pile. Such windfoils make both the entrainment of the fines during the dumping of particulate material and the protection of the pile against wind erosion independent of shifts in wind direction. Also, transversely extending windfoils may be employed at locations intermediate the ends of the pile. These effectively limit the working length of the main windfoil to an extent which will result in the efficient generation of eddy currents and, therefore, optimum protection against the entrainment of fines during dumping and against wind-based erosion of fines from the pile.

A windfoil system as just described can be furnished at a cost which is only a few percent of such alternative solutions as enclosing the pile.

Still another important advantage of my novel solution to the particulate solids scattering problem is that air can circulate freely around the pile, and heat can readily escape from the pile by radiation. This minimizes the possibility of spontaneous combustion occurring.

OBJECTS OF THE INVENTION

From the foregoing, it will be apparent to the reader that one important and primary object of the present invention resides in the provision of novel methods of an apparatus for preventing the pollution of air by the entrainment of particulate solids.

A second, equally important and primary object of my invention resides in the provision of such methods and apparatus which keep the particulate material from being entrained as it is dumped and from being eroded from the resulting pile, thereby eliminating the environmental pollution which such entrainment of fines would produce.

Other important but more specific objects of the present invention reside in the provision of methods and apparatus in accord with the preceding objects:

which are simple;

which are effective;

which are inexpensive in comparision to the heretofore proposed solutions to the problem of air pollution by particulate solids;

which operate independently of wind direction;

which accomplish the desired objective by diverting air currents over the top of the pile of particulate material being protecting and forming, on the leeward side of the pile, eddy currents from which entrained particulate material will drop out and be deposited on the pile;

which accomplish the foregoing diversion of air and formation of eddy currents with a vertically oriented windfoil extending at least partway along the pile of material being protected;

which keep downwardly directed loads imposed upon the windfoil by the particulate material from being transmitted to the structure from which the latter is supported;

in which provision is made for limiting the effective length of the windfoil and thereby promoting the formation of eddies on the leeward side of the pile of particulate material;

in which provision is made for reducing wind loads on the windfoil;

which effectively inhibit the scattering of particulate material even though only a fraction of the pile is protected by the windfoil;

which have various combinations of the foregoing attributes.

Other important objects and features and additional advantages of my invention will be apparent from the appended claims and as the ensuing detailed description and discussion proceeds in conjunction with the accompanying drawing.

DETAILED DESCRIPTION OF THE INVENTION

Figure 1:
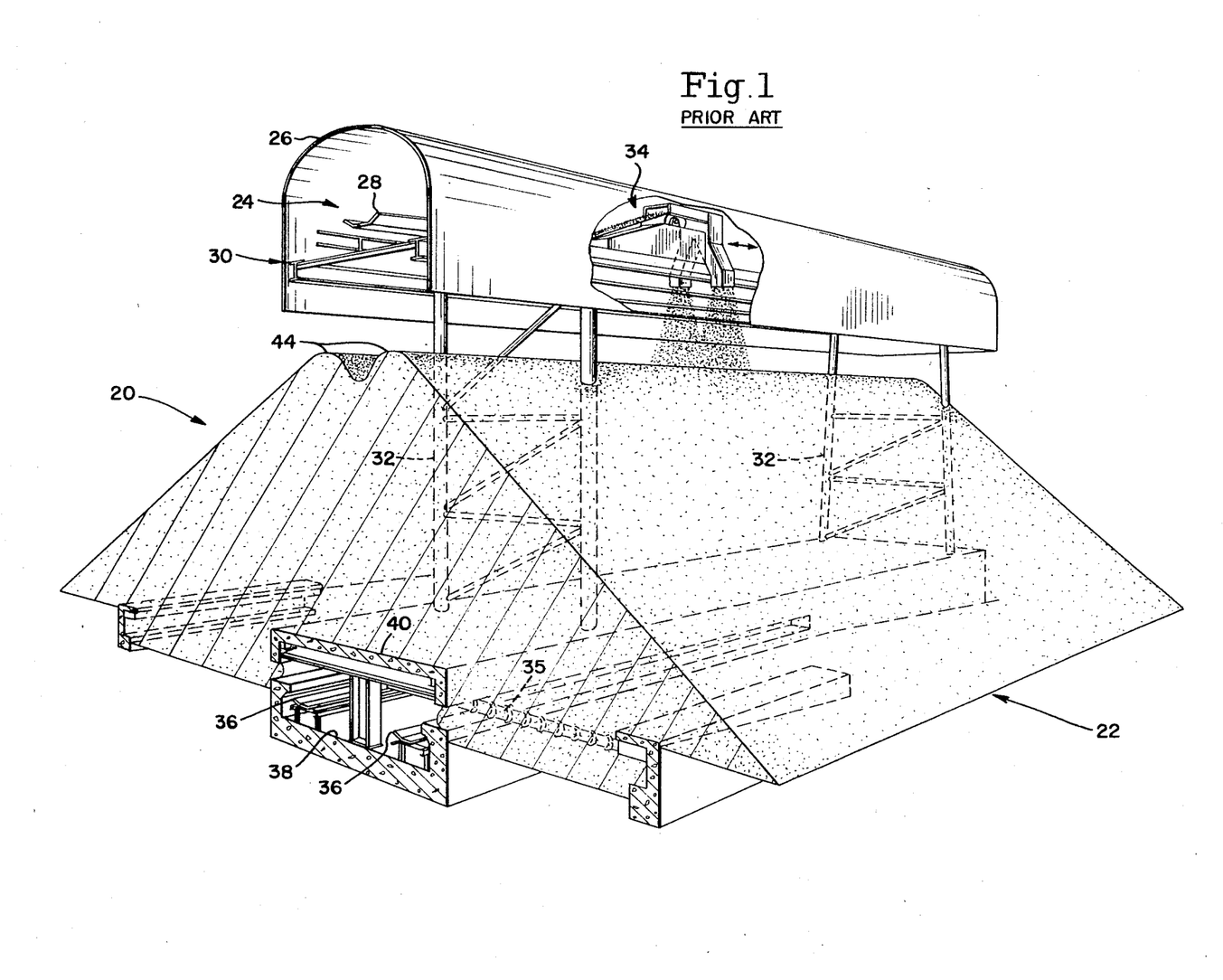
FIG. 1 shows, pictorially, a conventional system for handling particulate materials and a pile of such material deposited from an overhead conveyor incorporated in the material handling system.

Referring now to the drawing, FIG. 1 depicts a sawdust pile 20 which, as indicated above, may be upwards of fifty feet high, seventy-five feet wide at the base, and several hundred feet long. Sawdust is dumped onto pile 20 or in the area 22 in which the pile is located from a horizontal, overhead conveyor 24 of conventional construction which extends the length of the sawdust pile. Conveyor 24 is encased in a U-shaped housing 26 which is open at the bottom and is known as a "mailbox". The conveyor includes an upper run 28 and a lower run (not shown) supported by a structural framework 30. The conveyor is mounted at the elevated position shown in FIG. 1 on ladder-type supports 32 of conventional construction.

Associated with conveyor 24 is an equally conventional tripper 34 which is designed to traverse the length of the conveyor and to dump material from the latter onto pile 20 or into area 22 at designated locations therealong.

Particulate material is removed from the bottom of pile 20 by a combination of augers 35 (only one of which is shown) and endless conveyors 36. Both the endless conveyors and augers are conventional. The latter extend crosswise of pile 20 and are mounted so that they can traverse the length of the pile. This allows particulate material to be recovered from the latter at any designated location therealong.

As those skilled in the relevant arts will appreciate from FIG. 1, augers 35 transfer the particulate material to the center of pile 20 and onto conveyors 36 which, in turn, convey that material to the end of, or beyond, pile 20. The endless conveyors are housed in a vault 38 having a roof 40 that is designed to keep the particulate material from cascading into the vault.

As suggested above, pile 20 and the equipment employed to form that pile and remove particulate materials from it are of conventional character. Accordingly, neither the characteristics of the pile nor the details of the materials handling equipment will be described further herein except as is necessary to an understanding of the present invention.

As far as that invention is concerned, it will be obvious to the reader from FIG. 1 that wind can entrain and scatter material being dumped onto the pile from conveyor 24 at the location determined by tripper 34 and, similarly, pick up loose material from pile 20 and scatter it. The resulting environmental pollution is currently considered sufficiently serious to warrant sanctions as high as $10,000 per day for installations found to be in violation of current regulations.

Figure 2:
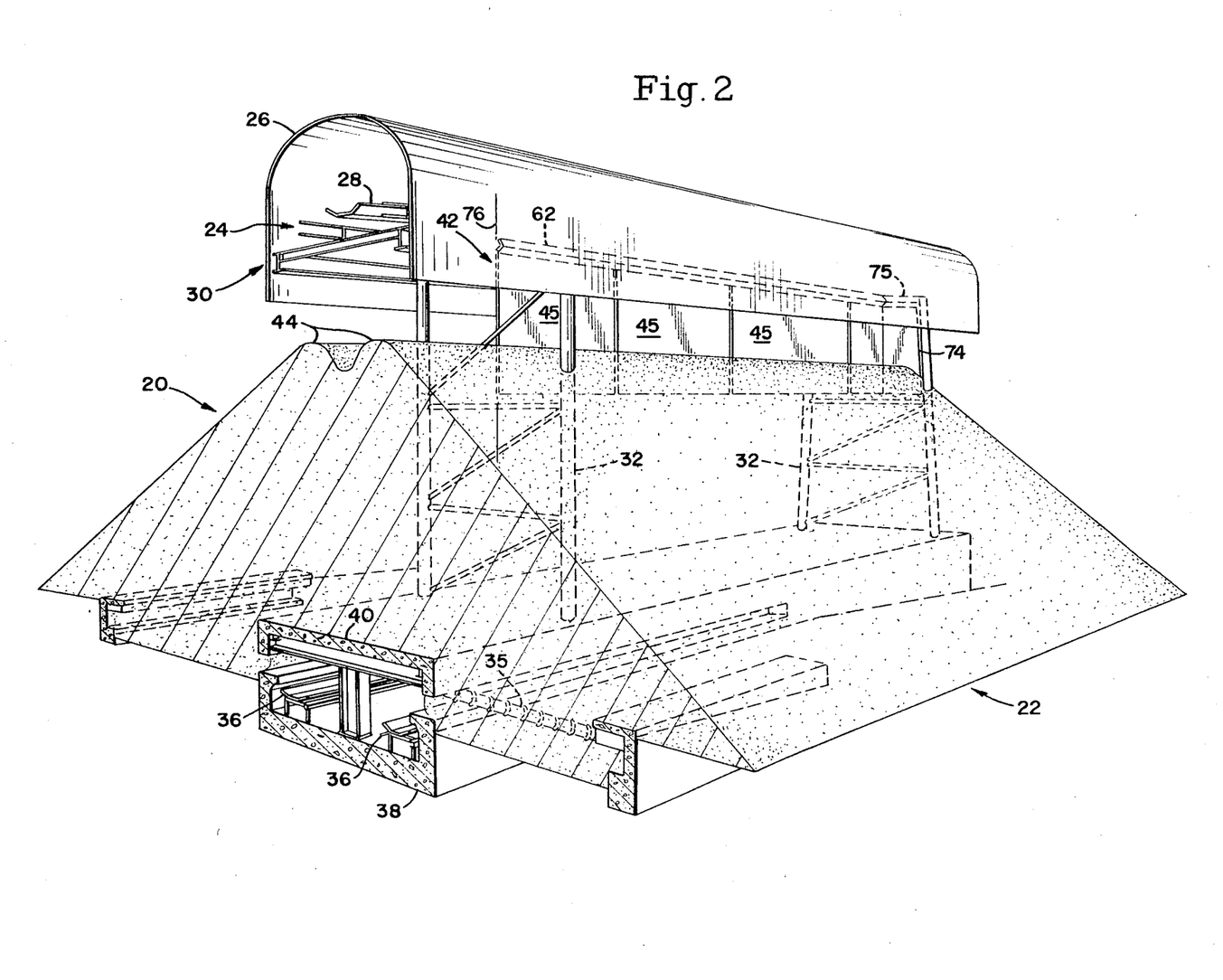
FIG. 2 is a view similar to FIG. 1 but illustrating the use of a windfoil in accord with the principles of the present invention to keep wind from entraining solids being dumped onto the pile and to keep wind from stripping particulate material from the pile.
Figure 3:
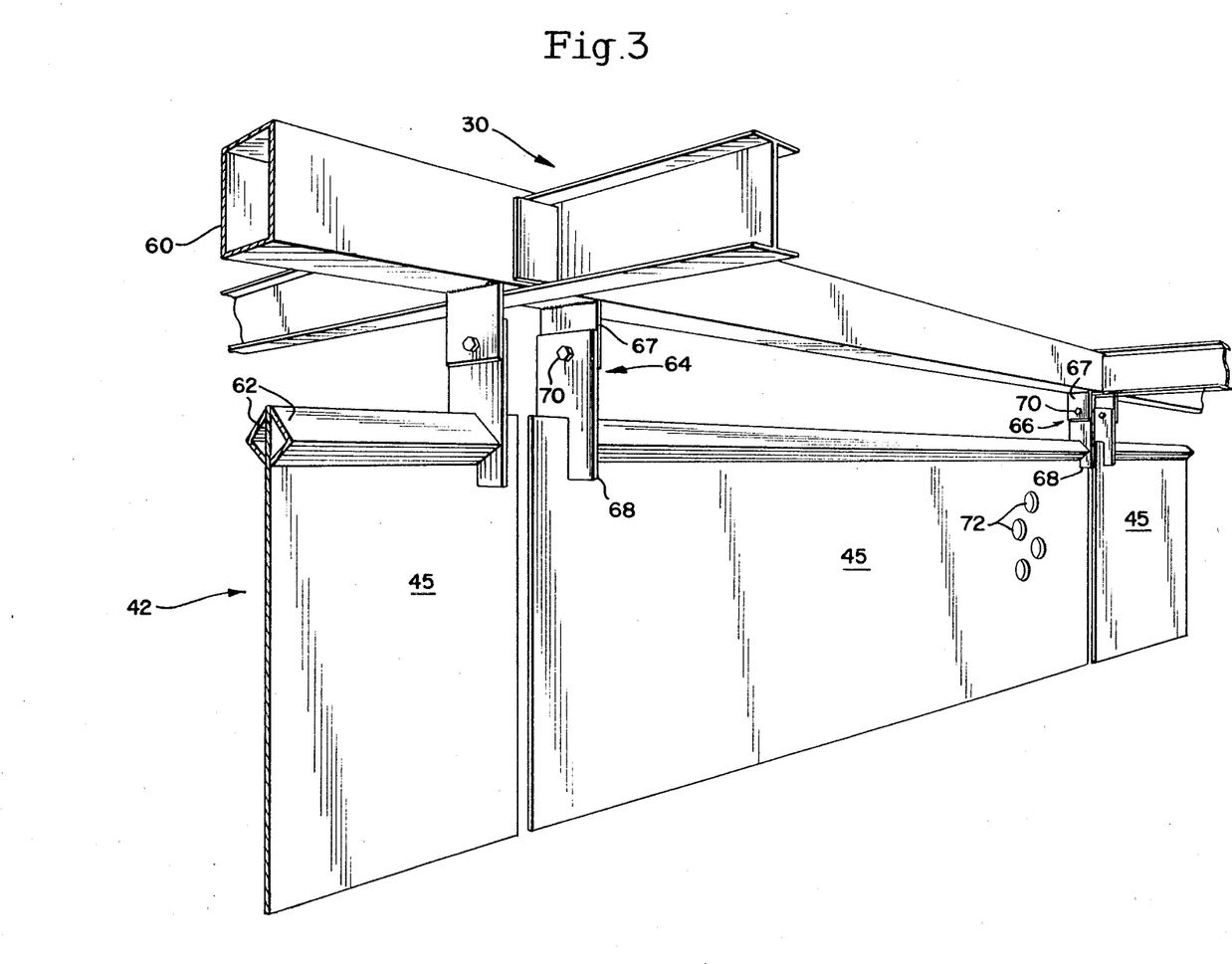
FIG. 3 shows, in perspective, the details of the windfoil and an arrangement for suspending the windfoil from the overhead conveyor of the material handling system.
Figure 5:
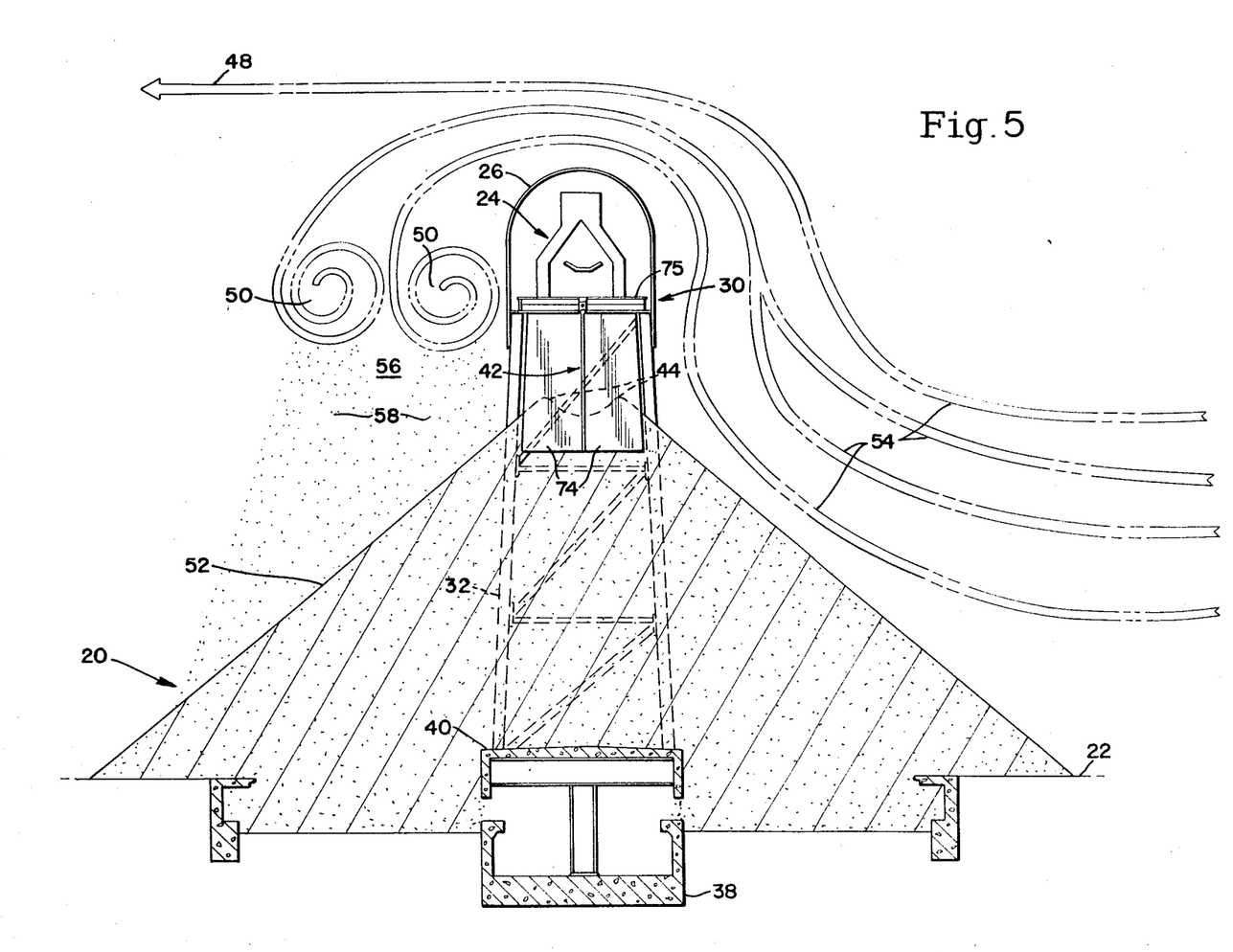
FIG. 5 is a view similar to FIG. 4 showing how the use of a windfoil in accord with the present invention prevents the entrainment of fines during the dumping of particulate material onto the pile and how it prevents the scattering of particulate material from the pile.

Referring now to FIGS. 2, 3, and 5, pollution of the environment with particulate material is prevented in accord with the principles of the present invention by suspending a platelike windfoil 42 between overhead conveyor 24 and the top 44 of the pile 20 of sawdust or other particulate material. In one typical application of the present invention windfoil 42 is fabricated from a three-eighths inch thick steel plate and has a height of sixteen feet. The windfoil spans between one-fourth and one-fifth of pile 20 and is fabricated in multiple, eight foot long sections 45 as shown in FIG. 3.

Protecting even this relatively small fraction of pile 20 against erosion with a windfoil was found to be effective. As indicated above, major pollution problems occur when material is being dumped on a pile such as that shown in the drawing. Consequently, by dumping on the protected part of the pile under windy conditions and on the remainder only when the air is calm, entrainment of particulate solids in the air surrounding the pile and the consequent environment pollution can be prevented.

Figure 4:
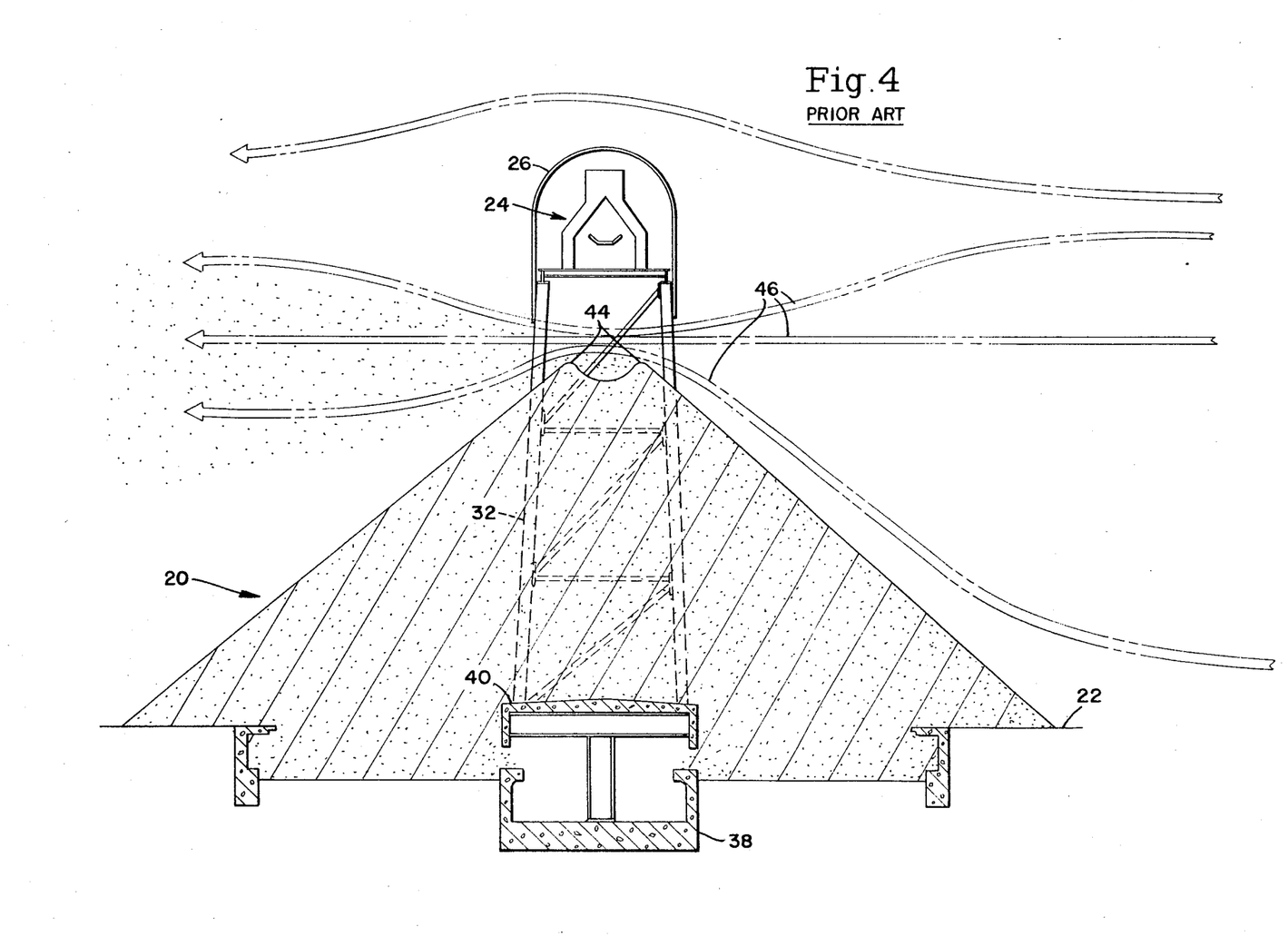
FIG. 4 shows how wind interacts with, and entrains, particulate material being dumped from an overhead conveyor and how the wind strips material from an unprotected pile of the character illustrated in FIG. 1.

The operation of windfoil 42 can best be appreciated from a comparison of FIGS. 4 and 5. Absent the windfoil, cross winds flow through what is in effect a venturi between conveyor 24 and pile 20 as shown by flow lines 46 in FIG. 4. The wind picks up particulate material being dumped onto the pile from the conveyor and, also, strips particulate material from the pile. The problem is pronounced because of the high velocity imparted to the wind because of the just discussed venturi effect. In contrast, with windfoil 42 installed, wind blowing in the direction indicated by arrow 48 in FIG. 5 is diverted by the windfoil over the top of mailbox 26, causing eddies 50 to form on the leeward side 52 of pile 20 as shown by flow lines 54 in FIG. 5. Particulate solids entrained in the wind drop out of the air in the area 56 of the eddies onto the leeward side 52 of pile 20 as indicated at 58 in FIG. 5. That keeps the particulate material from being carried away from the pile.

It is important in this respect that windfoil 42 eliminates the venturi effect appurtenant to an unprotected pile as discussed in conjunction with FIG. 4. Consequently, such air as might flow between conveyor 24 and the top 44 of pile 20 will have a much lower velocity and will be less apt to pick up fines from particulate material being dumped onto the pile.

In actual practice, it has been found that some of the particulate material will also drop out of the air currents onto the leeward side of mailbox 26. This material simply slides down the side of the mailbox onto the leeward side of pile 20.

Referring now specifically to FIG. 3, the structural framework 30 of conveyor 24 includes a longitudinal beam 60 extending along the midline of pile 20. The several sections 45 of windfoil 42, reinforced along their upper edge by a boxlike structure made up of angle irons 62, are pivotally supported from beam 60 by a pair of axially aligned hinges 64 and 66. These hinges include a strap 67 fixed to beam 60 and a second strap 68 which is attached to the associated windfoil section 45 and connected to the beam-attached strap 68 by a shear pin 70. Thus pivotally supporting the windfoil 42 from conveyor 24 substantially reduces wind loads on the former.

For windfoil 42 to prevent the entrainment of particulate material in the manner described above, the lower edge of that windfoil can be proximate to (i.e., spaced slightly above) or in contact with the top 44 of pile 20, or that edge of the windfoil can be buried in the particulate material making up the pile. In the latter case, wind loads on the windfoil are partially transferred to and absorbed by the material making up the pile.

Wind loads on windfoil 42 can also be reduced by appropriately perforating the sections 45 making up the windfoil. Such perforations are shown diagrammatically in FIG. 3 and identified by reference character 72.

As particulate solids are withdrawn from the bottom of pile 20 in the manner discussed above in conjunction with FIG. 1, downwardly acting forces of considerable magnitude can be imposed upon the windfoil sections 45 by virtue of the friction between them and the particulate solids in the pile. Shear pins 70 prevent those downwardly acting forces from reaching a magnitude at which damage to structural components of conveyor 24 might result. The shear pins similarly function to keep unacceptably high wind loads from being imposed on the conveyor.

To further minimize the possibility of damage to conveyor 24 by downwardly directed forces, windfoil sections 45 with smooth surfaces are preferably employed in the interest of minimizing the friction between those sections and the particulate material in pile 20.

As suggested above, steel is one suitable material for the windfoil. Aluminum and other structural metals can of course also be used.

Referring again to FIG. 2, windfoil 42 effectively prevents the entrainment of particulate material during dumping and by the erosion of particulate material from pile 20 by winds blowing across or quartering the pile. Entrainment of the solids making up the pile by winds blowing in a direction more closely approaching the longitudinal axis of pile 20 can be prevented by suspending a second windfoil 74 from the structural framework of conveyor 24 at the end of windfoil 42 coterminous with the end of pile 20. Windfoil 74 is oriented to extend crosswise of pile 20 and can, like windfoil 42, be made up from more than one section. Also, it will preferably be pivotally suspended from cross beam 75 of conveyor 24 by shear pins as discussed above and shown in FIG. 3 to reduce wind loads on it and to guard against damage to the conveyor's structural components.

As discussed above, and shown in FIG. 5, the formation of eddy currents 50 on the leeward side 52 of pile 20 is an important function of windfoil 42. The formation of such eddies can in some cases be promoted by disposing transversely oriented intermediate windfoils at intervals along windfoil 42 (a typical location is indicated by reference 76). The intermediate windfoils limit the effective length of the longitudinally extending windfoil 42, thereby favoring the formation of the eddy currents.

These intermediate windfoils are, preferably, also pivotally suspended from cross beams of the structural framework of conveyor 24 with shear pins in the manner shown in FIG. 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A particulate material handling system which is capable of reducing the pollution of air by the entrainment of particulate solids, said system comprising: a covered elevated conveyor means from which the particulate material can be deposited to form a pile of that material in a designated area or to add to such a pile and air diversion means which is adapted to so cooperate with said conveyor as to prevent wind from entraining fines in the particulate material as it is dumped onto the pile or into said area and to prevent wind from stripping and entraining material from the pile by diverting said wind upwardly over the top of said elevated conveyor means and creating an eddy in the air on the leeward side of the pile of particulate material, whereby particulate material entrained in the air diverted over the elevated conveyor means will drop out of the air currents in the region where the eddy currents are formed and be deposited on the leeward side of the pile, said air diversion means being vertically oriented and adapted to extend lengthwise along at least the initial segment of said pile and essentially along the longitudinal centerline thereof, said air diversion means having a lower edge which is adapted to be proximate to, in contact with, or buried in said pile depending on the height of the pile, and said conveyor being so constructed that it is capable of depositing particulate material on both sides of said air diversion means.

2. A particulate material handling system which is capable of reducing the pollution of air by the entrainment of particulate solids, said system comprising: a covered elevated conveyor means from which the particulate material can be deposited to form a pile and means which is adapted to so cooperate with said conveyor as to prevent wind from entraining fines in the particulate material as it is dumped onto the pile or into said area and to prevent wind from stripping and entraining material from a pile, said last-mentioned means comprising a vertically oriented windfoil extending downwardly from and along said conveyor means with its lower edge being adapted to be proximate to, in contact with the top of, or buried in the pile of particulate material depending upon the height of the pile, said windfoil being adpated to be located approximately midway between the edges of said pile and to span at least the initial segment of the pile and said conveyor being so contructed as to be capable of depositing particulate material on both sides of said windfoil.

3. A particulate material handling system according to claim 2 which includes means for so supporting said windfoil from said elevated conveyor means as to provide for pivotal movement of said windfoil about an axis extending in the same direction as the longitudinal axis of the elevated conveyor means.

4. A particulate material handling system according to claim 3 wherein the means for supporting the windfoil from the elevated conveyor means comprises shear pin means which keep excessive loads from being imposed on said elevated conveyor by way of said windfoil.

5. A particulate material handling system as defined in claim 2 which includes a second windfoil at an end of the first-mentioned windfoil which is proximate to an end of said pile, said second windfoil extending downwardly from said elevated conveyor means and across said pile with its lower edge proximate to or in contact with the top of the pile or buried in the particulate material.

6. A particulate material handling system according to claim 5 which includes means for so supporting said second windfoil from said elevated conveyor means as to provide for pivotal movement of said windfoil about an axis extending generally normal to the longitudinal axis of the elevated conveyor means.

7. A particulate material handling system according to claim 6 wherein the means for supporting said second windfoil from the elevated conveyor means comprises shear pin means which keep excessive loads from being imposed on said elevated conveyor by way of said second windfoil.

8. A particulate material handling system according to claim 5 wherein said second windfoil is fabricated of metal and has side surfaces which are sufficiently smooth to at least partially prevent downwardly moving particulate material in said pile from gripping and thereby exerting a downward force on said windfoil.

9. A particulate material handling system according to claim 2 wherein said windfoil is fabricated of metal and has side surfaces which are sufficiently smooth to at least partially prevent downwardly moving particulate material in said pile from gripping and thereby exerting a downward force on said windfoil.

10. A particulate material handling system as defined in claim 1 which includes at least one intermediate windfoil located between the ends of and extending across the pile of particulate material for limiting the effective length of the first-mentioned windfoil and thereby promoting the formation of eddies on the leeward side of the pile as aforesaid.

11. A particulate material handling system as defined in claim 1 wherein said windfoil is perforated to a degree sufficient to reduce wind loads on said windfoil.

* * * * *